(12) United States Patent
Hu et al.

(10) Patent No.: US 11,754,771 B1
(45) Date of Patent: Sep. 12, 2023

(54) OPTICAL VIRTUAL PUSH BUTTON TOUCH PANEL

(71) Applicant: AXIOMTEK CO., LTD., New Taipei (TW)

(72) Inventors: Tien-Hon Hu, New Taipei (TW); Po-Yuan Chiu, New Taipei (TW); Yi-Kai Kao, New Taipei (TW)

(73) Assignee: AXIOMTEK CO., LTD., New Taipei (TW)

( * ) Notice: Subject to any disclaimer, the term of this patent is extended or adjusted under 35 U.S.C. 154(b) by 0 days.

(21) Appl. No.: 18/082,635

(22) Filed: Dec. 16, 2022

(51) Int. Cl.
*F21V 8/00* (2006.01)
*G06F 3/044* (2006.01)

(52) U.S. Cl.
CPC ........... *G02B 6/006* (2013.01); *G02B 6/0088* (2013.01); *G06F 3/044* (2013.01)

(58) Field of Classification Search
CPC ...... G06F 3/044; G06F 3/0202; G06F 1/1692; G06F 3/0216; G06F 3/0213; G06F 21/83; G02B 6/006; G02B 6/0088
See application file for complete search history.

(56) References Cited

U.S. PATENT DOCUMENTS

| | | | |
|---|---|---|---|
| 2009/0250329 A1* | 10/2009 | Yu | H03K 17/9622 200/5 A |
| 2012/0147584 A1* | 6/2012 | Wu | G06F 3/0202 362/23.16 |
| 2018/0024736 A1* | 1/2018 | Lin | G06F 1/1662 345/173 |
| 2019/0063722 A1* | 2/2019 | Sugiyama | B32B 21/08 |
| 2019/0278473 A1* | 9/2019 | Fornasier | G06F 3/04817 |

* cited by examiner

*Primary Examiner* — Hong Zhou
(74) *Attorney, Agent, or Firm* — Alan D. Kamrath; Karin L. Williams; Mayer & Williams PC

(57) ABSTRACT

An optical virtual push button touch panel includes a substrate (10), a light emitting member (11), a light guide plate (12), a light permeable plate (13), and a touch control sensing member (14). The substrate is provided with a mounting slot (100). The light emitting member is mounted in the substrate. The light guide plate defines multiple light guide structures (120). The light permeable plate is mounted on the substrate. The touch control sensing member is located between the light permeable plate and the light guide plate and defines multiple contact zones (140) aligning with the light guide structures respectively. One of the contact zones produces a coupling capacitance through the light permeable plate and drives the light emitting member to generate the light source, and one of the light guide structures converges the light source toward one of the contact zones.

8 Claims, 4 Drawing Sheets

OPTICAL VIRTUAL PUSH BUTTON TOUCH PANEL

BACKGROUND OF THE INVENTION

1. Field of the Invention

The present invention relates to an optically control device and, more particularly, to an optical virtual push button touch panel.

2. Description of the Related Art

A conventional game console or device is controlled through physical push buttons mounted on a keyboard. However, the keyboard has a complicated mechanic structure that allows the push buttons to be pressed, to rebound or bounce back, and to produce a control signal to the circuit board. Thus, the mechanic structure is easily worn out during a long-term utilization and will be broken due to an excessive pressing force. In addition, a light source with different colors is mounted in the push buttons so that the push buttons present a lighting display with different colors. However, the colors of the push buttons from the light source are fixed and cannot be changed or adjusted, thereby limiting the aesthetic quality of the push buttons.

BRIEF SUMMARY OF THE INVENTION

The primary objective of the present invention is to provide an optical virtual push button touch panel that is operated in a virtual manner without needing a traditional push button.

In accordance with the present invention, there is provided an optical virtual push button touch panel comprising a substrate, a light emitting member, a light guide plate, a light permeable plate, and a touch control sensing member. The substrate is provided with a mounting slot and a fixed structure. The fixed structure surrounds the mounting slot. The light emitting member is mounted in the fixed structure. The light emitting member generates a light source directed toward the mounting slot. The light guide plate defines multiple light guide structures. The light source of the light emitting member is guided and converged by the light guide structures to produce a light source convergence. The light permeable plate is mounted on a side of the substrate and covers the light guide plate. The touch control sensing member is located between the light permeable plate and the light guide plate. The touch control sensing member defines multiple contact zones aligning with the light guide structures respectively. One of the contact zones produces a coupling capacitance through the light permeable plate and drives the light emitting member to generate the light source, and one of the light guide structures converges the light source toward one of the contact zones.

According to the primary advantage of the present invention, the optical virtual push button touch panel is operated easily without having to press a push button, thereby facilitating the user operating the optical virtual push button touch panel.

According to another advantage of the present invention, the optical virtual push button touch panel has a simplified construction to decrease the cost of fabrication.

According to a further advantage of the present invention, the optical virtual push button touch panel produces a diverse lighting effect through the touch control sensing member and the light emitting member, thereby enhancing the aesthetic quality.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
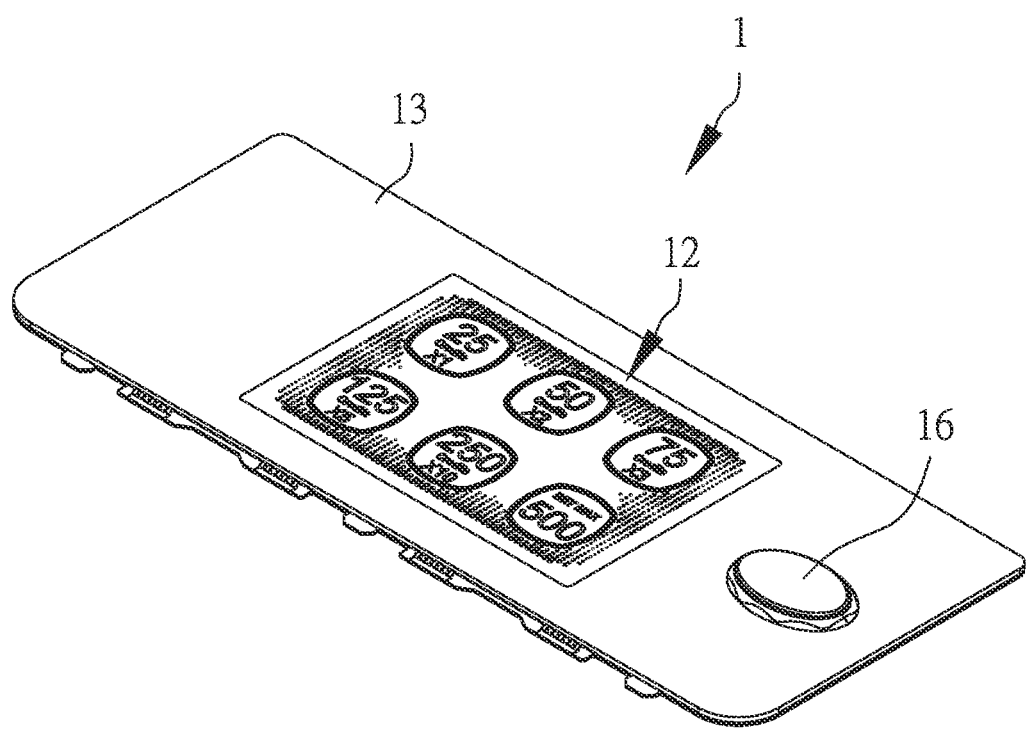
FIG. 1 is a perspective view of an optical virtual push button touch panel in accordance with the preferred embodiment of the present invention.
Figure 2:
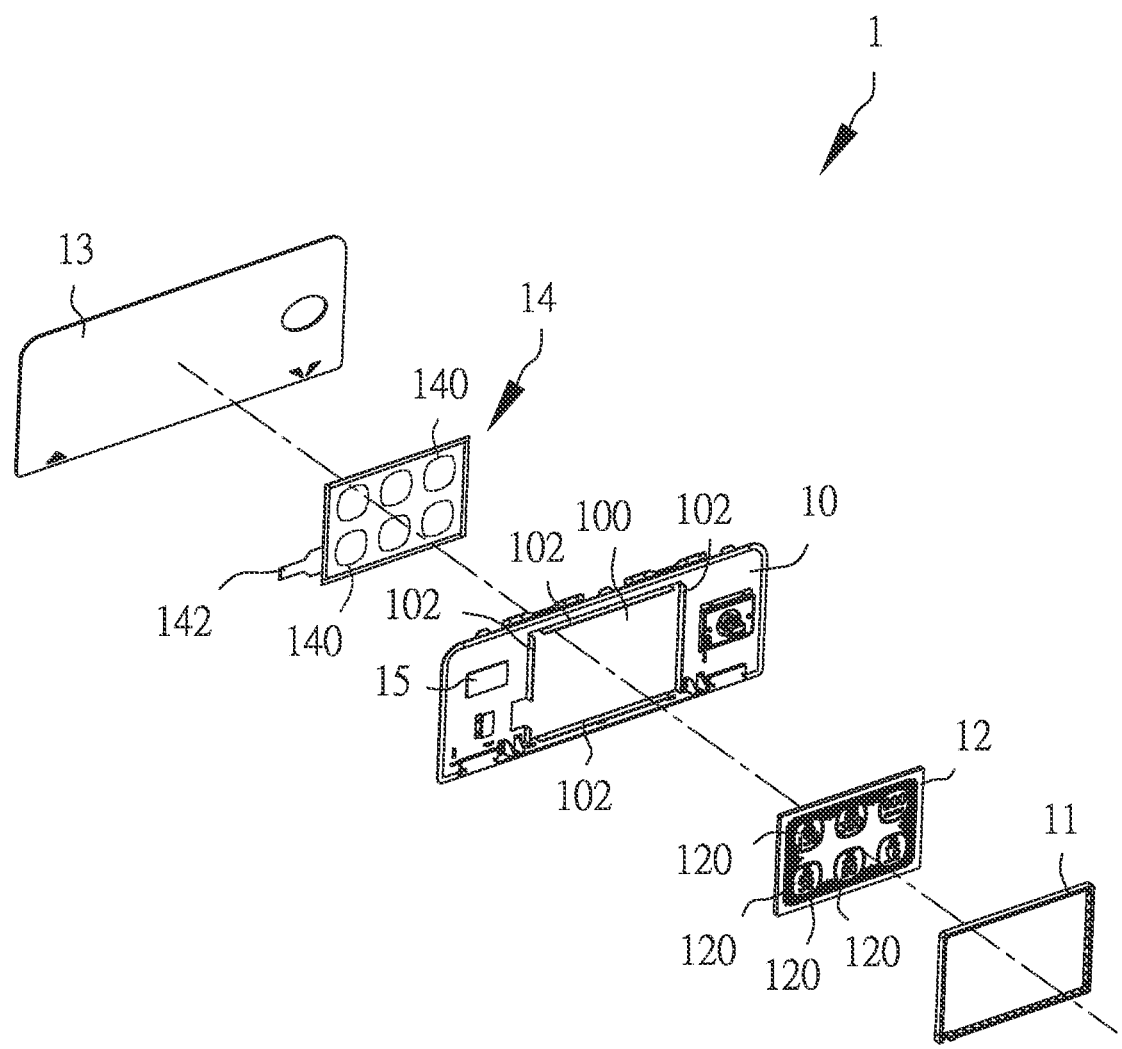
FIG. 2 is an exploded perspective view of the optical virtual push button touch panel in accordance with the preferred embodiment of the present invention.
Figure 3:
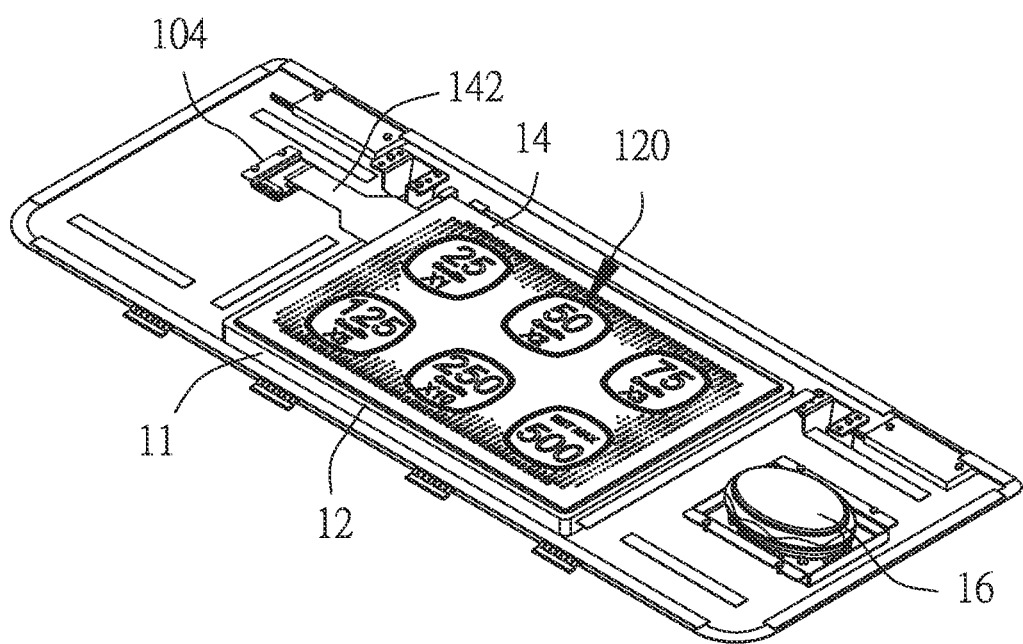
FIG. 3 is a perspective view showing the interior structure of the optical virtual push button touch panel without the light permeable plate.

Referring to the drawings and initially to FIGS. 1-3, an optical virtual push button touch panel 1 in accordance with the preferred embodiment of the present invention comprises a substrate (or base plate) 10, a light emitting member 11, a light guide plate (or light conductive board) 12, a light permeable plate (or transparent board) 13, and a touch control sensing member 14.

The substrate 10 is provided with a mounting slot 100 and a fixed structure (or fixture) 102. The fixed structure 102 surrounds the mounting slot 100.

The light emitting member 11 is mounted in the mounting slot 100 and secured by the fixed structure 102. The light emitting member 11 surrounds the fixed structure 102 and generates a light source directed toward the mounting slot 100.

The light guide plate 12 is mounted in the mounting slot 100 and defines multiple light guide (or indicating) structures 120. The light source of the light emitting member 11 is guided and converged (or gathered or concentrated) by the light guide structures 120 to produce a light source convergence.

The light permeable plate 13 is mounted on a side of the substrate 10 and covers the light guide plate 12.

The touch control sensing member 14 is mounted in the mounting slot 100 and located between the light permeable plate 13 and the light guide plate 12. The touch control sensing member 14 defines multiple contact zones 140 aligning with the light guide structures 120 respectively. One of the contact zones 140 produces a coupling capacitance (or capacitor or condenser) through the light permeable plate 13 and drives the light emitting member 11 to generate the light source, and one of the light guide structures 120 converges the light source toward one of the contact zones 140.

In the preferred embodiment of the present invention, the substrate is provided with an operation module 15 and a connector (or receiver) 104. The connector 104 is electrically connected with the operation module 15. The operation module 15 is electrically connected with the light emitting member 11. The operation module 15 controls generation of the light source of the light emitting member 11.

In the preferred embodiment of the present invention, the touch control sensing member 14 is provided with a signal connecting (or transmitting) portion 142 electrically connected with the connector 104 of the substrate 10 so that the touch control sensing member 14 is electrically connected with the operation module 15.

In the preferred embodiment of the present invention, each of the light guide structures 120 has an arrangement (or appearance) including a number, a character, a figure or a matrix. Preferably, the arrangement of each of the light guide structures 120 is formed by special inks such as infrared inks, recessive fluorescent inks, light-transmitting inks, machining or tungsten wires. For example, when the arrangement is presented by a number, each of the light guide structures 120 is formed by a groove which has two opposite faces and a hollow bottom face. When the light source is introduced into each of the light guide structures 120, the light is guided and reflected by the two opposite faces and the hollow bottom face to produce a light convergence or concentration so that the number is shown in the groove of each of the light guide structures 120.

In the preferred embodiment of the present invention, the optical virtual push button touch panel 1 further comprises a push button device 16 mounted on the substrate 10. The push button device 16 is connected with a switch for starting an external device.

In the preferred embodiment of the present invention, the light guide plate 12 is made of transparent material, including an optical acrylic board, PC, PVC, glass, transparent resin or transparent wood.

When the light guide plate 12 is made of transparent wood, the internal texture of the wood is not changed after the color of the wood fades. Then, the wood is soaked so that the epoxy resin is absorbed by the tiny conduits that are used to transport nutrients in the wood. In such a manner, the epoxy resin has a refractive index close to that of optical glass so that the light passes through the wood, and the wood is made transparent, and In the preferred embodiment of the present invention, the light permeable plate 13 is made of transparent material, including glass or plastics.

In the preferred embodiment of the present invention, the light emitting member 11 is an LED strip, a lighting board or an optical fiber strip.

In the preferred embodiment of the present invention, the fixed structure 102 of the substrate 10 is formed on a peripheral wall of the mounting slot 100 and is bent inward for fixing the light emitting member 11.

In the preferred embodiment of the present invention, the light emitting member 11 surrounds and is fixed in the fixed structure 102. The light emitting member 11 has a terminal provided with an electric plug electrically connected with the operation module 15 of the substrate 10. Thus, the operation module 15 provides an electric power to the light emitting member 11 for lighting. In addition, the operation module 15 is loaded with multiple lighting modes. Preferably, the operation module 15 is a circuit board that is electrically connected with an external power supply and includes an operation unit for loading the lighting modes.

In the preferred embodiment of the present invention, the contact zones 140 of the touch control sensing member 14 are formed by a design of potential distribution. Each of the contact zones 140 corresponds to one of the lighting modes of the operation module 15. Each of the lighting modes includes color variation, flashing variation or monochrome display.

In practice, the coupling capacitance is generated when the light permeable plate 13 is touched by a human body so that one of the contact zones 140 is triggered, and the signal connecting portion 142 of the touch control sensing member 14 transmits a signal to the connector 104 of the substrate 10 so that the operation module 15 drives one of the lighting modes respectively.

Figure 4:
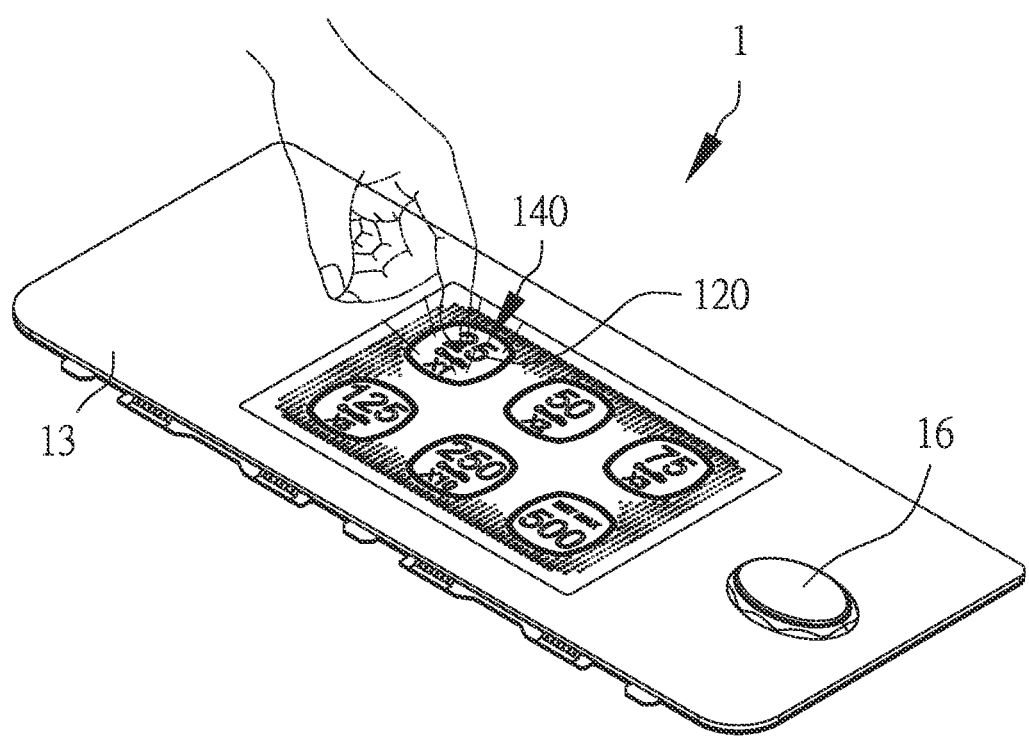
FIG. 4 is a schematic operational view of the optical virtual push button touch panel as shown in FIG. 1 in use.

In operation, referring to FIG. 4 with reference to FIGS. 1-3, the light guide plate 12 defines six light guide structures 120, and the touch control sensing member 14 defines six contact zones 140 aligning with the light guide structures 120 respectively. The light guide structures 120 are arranged to form a matrix, and each of the light guide structures 120 presents a number. The light guide structures 120 light in a non-contact manner. The light permeable plate 13 is a capacitance (or capacitor) touch board which includes a glass layer, an ITO (indium tin oxide) layer coated on an inner face of the glass layer, and a glass protecting layer (made of silica) mounted on an outer face of the glass layer. The ITO layer is served as a working surface with four corners releasing or discharging four electrodes. All of the electrodes have the same potential when the human body is not in contact with the light permeable plate 13, so that no electric current passes through the light permeable plate 13. When the user's finger touches the light permeable plate 13, a coupling capacitor or capacitance is generated on the surface of the light permeable plate 13. The coupling capacitor is a direct conductor, and the user's finger absorbs a small electric current from the contact point with the light permeable plate 13, so that the electric current flows outward from the four electrodes of the four corners of the light permeable plate 13 respectively. At this time, the electric current value passing each of the four electrodes is proportional to the distance between the user's finger and each of the four corners of the light permeable plate 13. Thus, the contact position of the user's finger with the light permeable plate 13 is calculated to decide the location of the light permeable plate 13 corresponding to or aligning with one of the contact zones 140.

Both of the light permeable plate 13 and the light guide plate 12 are made of transparent material, so that the light guide structures 120 of the light guide plate 12 are seen directly through the light permeable plate 13. The numbers 25, 50, 75, 125, 250, and 500 of the light guide structures 120 correspond to the contact zones 140 of the touch control sensing member 14 respectively. For example, when the user's finger touches the light permeable plate 13 located at the position corresponding to the number "25" of one of the light guide structures 120, a signal indicating the position of the respective contact zone 140 is transmitted through the signal connecting portion 142 of the touch control sensing member 14 to the connector 104 of the substrate 10, and the operation module 15 drives one of the lighting modes respectively, so that the light emitting member 11 is driven by the operation module 15, and the light source of the light emitting member 11 is directed toward the respective light guide structure 120. Thus, the light is converged on the respective contact zone 140 to indicate the number "25". When the user's finger leaves the light permeable plate 13, the coupling capacitor disappears, the operation module 15 turns off the light emitting member 11, and the light is shut.

In conclusion, the light permeable plate 13 is touched by the human body to generate a light source on the touch control sensing member 14 through an action of the light guide plate 12.

Accordingly, the optical virtual push button touch panel 1 is operated easily without having to press a push button, thereby facilitating the user operating the optical virtual push button touch panel 1. In addition, the optical virtual push button touch panel 1 has a simplified construction to decrease the cost of fabrication. Further, the optical virtual push button touch panel 1 produces a diverse lighting effect through the touch control sensing member 14 and the light emitting member 11, thereby enhancing the aesthetic quality.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An optical virtual push button touch panel (1) comprising:
    a substrate (10), a light emitting member (11), a light guide plate (12), a light permeable plate (13), and a touch control sensing member (14);
    wherein:
    the substrate is provided with a mounting slot (100) and a fixed structure (102);
    the fixed structure surrounds the mounting slot;
    the light emitting member is mounted in the fixed structure;
    the light emitting member generates a light source directed toward the mounting slot;
    the light guide plate defines multiple light guide structures (120);
    the light source of the light emitting member is guided and converged by the light guide structures to produce a light source convergence;
    the light permeable plate is mounted on a side of the substrate and covers the light guide plate;
    the touch control sensing member is located between the light permeable plate and the light guide plate;
    the touch control sensing member defines multiple contact zones (140) aligning with the light guide structures respectively; and
    one of the contact zones produces a coupling capacitance through the light permeable plate and drives the light emitting member to generate the light source, and one of the light guide structures converges the light source toward one of the contact zones.

2. The optical virtual push button touch panel as claimed in claim 1, wherein:
    the substrate is provided with an operation module (15) and a connector (104);
    the connector is electrically connected with the operation module;
    the operation module is electrically connected with the light emitting member; and
    the operation module controls generation of the light source of the light emitting member.

3. The optical virtual push button touch panel as claimed in claim 2, wherein the touch control sensing member is provided with a signal connecting portion (142) electrically connected with the connector of the substrate.

4. The optical virtual push button touch panel as claimed in claim 1, wherein each of the light guide structures has an arrangement including a number, a character, a figure or a matrix.

5. The optical virtual push button touch panel as claimed in claim 1, further comprising:
    a push button device (16) mounted on the substrate.

6. The optical virtual push button touch panel as claimed in claim 1, wherein the light guide plate is made of transparent material, including an optical acrylic board, PC, PVC, glass, transparent resin or transparent wood.

7. The optical virtual push button touch panel as claimed in claim 1, wherein the light permeable plate is made of transparent material, including glass or plastics.

8. The optical virtual push button touch panel as claimed in claim 1, wherein the light emitting member is an LED strip, a lighting board or an optical fiber strip.

* * * * *